United States Patent
Codilian (10) Patent No.: US 6,657,811 B1
(45) Date of Patent: Dec. 2, 2003

(54) MOBILE DEVICE AND DISK DRIVE HAVING A SEEK CURRENT PROFILE RESPONSIVE TO AN ENVIRONMENT SIGNAL

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 384 days.

(21) Appl. No.: 09/866,204

(22) Filed: May 25, 2001

(51) Int. Cl.$^7$ ................................................ G11B 5/596
(52) U.S. Cl. ........................ 360/78.06; 360/69; 360/75
(58) Field of Search ................................ 360/78.06, 69, 360/97.02, 73.03, 75, 78.01, 78.04, 73.01, 73.08

(56) References Cited

U.S. PATENT DOCUMENTS

| | | | |
|---|---|---|---|
| 5,682,273 A | * 10/1997 | Hetzler | ........................ 360/75 |
| 5,764,430 A | 6/1998 | Ottesen et al. | |
| 6,038,096 A | 3/2000 | Zhang et al. | |
| 6,101,065 A | 8/2000 | Alfred et al. | |
| 6,154,858 A | * 11/2000 | Ottesen et al. | ................. 714/42 |
| 6,169,930 B1 | * 1/2001 | Blachek et al. | ................. 700/79 |
| 6,175,918 B1 | * 1/2001 | Shimizu | ......................... 713/1 |
| 6,195,222 B1 | 2/2001 | Heminger et al. | |
| 6,327,119 B1 | * 12/2001 | Barina et al. | ............ 360/256.4 |

FOREIGN PATENT DOCUMENTS

| WO | WO 00/65590 | 11/2000 |
|---|---|---|

\* cited by examiner

*Primary Examiner*—David Hudspeth
*Assistant Examiner*—Fred F. Tzeng
(74) *Attorney, Agent, or Firm*—Milad G. Shara, Esq.; Knobbe Martens Olson & Bear LLP (57) ABSTRACT

A servo system in a disk drive in a mobile device is responsive to an environment signal from the mobile device to generate a first current profile to a head actuator when the mobile device is docked and to generate a second current profile to the head actuator when the mobile device is mobile. The second current profile requires less power than the first current profile, thus reducing current drain on a battery in the mobile device.

21 Claims, 8 Drawing Sheets

MOBILE DEVICE AND DISK DRIVE HAVING A SEEK CURRENT PROFILE RESPONSIVE TO AN ENVIRONMENT SIGNAL

BACKGROUND OF THE INVENTION

1. Field of the Invention

The present invention relates to a mobile device having a disk drive that has a reduced battery drain in performing a track seeking operation when operating in a mobile environment.

2. Description of the Related Art

Hard disk drives store large volumes of data on one or more disks mounted on a spindle assembly. The spindle assembly includes a spindle motor for rotating the disks at a nominal angular velocity. Disk drives employ a disk control system for interfacing with a host (e.g., a computer) to control the reading and writing of data on a disk. Each disk includes up to two disk surfaces which are capable of storing data. On each disk surface, user data is stored in concentric circular tracks between an outside diameter and an inside diameter of the disk. Servo systems are employed to maintain alignment of a transducer head with a desired target data track (termed "track following") for reading and writing user data on the disk surface within desired control parameters.

Embedded servo systems store servo data on the same disk surface as user data to provide control signals and information employed in the operation of the servo system. User data on the disk surface is divided into groups of data sectors. Embedded servo information is recorded in servo sectors placed in arcuate, radially continuous narrow wedges between the groups of data sectors. In this regard, servo sectors are commonly referred to as "servo wedges." For example, a concentric data track may typically include 120 equally spaced servo wedges with data regions (i.e., a region typically containing 3–6 data sectors and up to 2 partial data sectors) located between adjacent pairs of servo wedges.

Each servo wedge includes fields containing track identification used in track seeking operations and tracking information used in track following operations. For example, the track identification information may include track number and/or address and wedge number, and the tracking information may include automatic gain control (AGC) and phase lock oscillator information (PLO), timing information (e.g., a servo sync word) and servo burst information for positioning a transducer head over the disk surface. The fields are defined by transitions written on the disk surface in patterns readable by the servo system. During execution of a command to read or write data to a target data sector on the disk surface, servo information is sampled as the servo wedges pass under the associated transducer head. The rate at which servo information is sampled, termed "servo sampling rate," is therefore determined by the number of wedges per track and the angular velocity of the disk.

Disk drive design engineers strive to optimize designs at a servo sampling rate which enables reliable transducer head positioning by avoiding resonances from actuator mechanics, providing adequate servo system phase margins, and detecting shock events. A further constraint on optimization of servo sampling rate is a tradeoff between angular velocity of the disk and the number of wedges per track. Since the wedges are embedded in the data track, some capacity which could be available for user data is consumed, therefore it is desirable to achieve an efficient surface format by only including a sufficient number of wedges per track necessary to meet the optimum servo sampling rate for a given angular velocity.

The process of moving a head from a current track position to a desired or target track position is known as a "seek." The disk drive includes a servo system that is utilized both to seek to a selected target track and thereafter follow the target track on the disk. A seek to a selected target track is commonly made in accordance with a profile of command effort to the actuator for a respective seek distance, which is stored in memory and accessible by the servo system controller.

The seek profile can be described in terms of current draw, velocity, position or cumulative power consumption. A seek profile (described in terms of velocity) can include three components: an acceleration profile, an optional coast interval, and a deceleration profile. The acceleration profile, typically set to the maximum acceleration permitted by the hardware, involves the initial portion of the seek when the actuator is gaining speed. A coast interval may be included during which the velocity remains substantially constant. The deceleration profile ends with both acceleration and velocity close to zero as the head approaches the target track.

Figure 2:
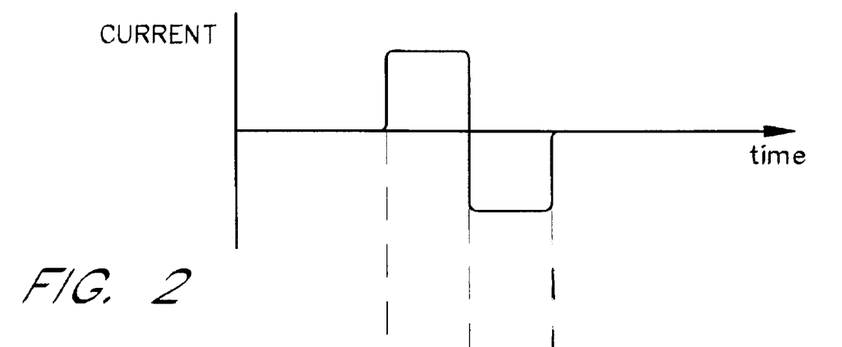
FIG. 2 is a graph illustrating a seek profile showing a plot of current applied to the voice coil motor.
Figure 3:
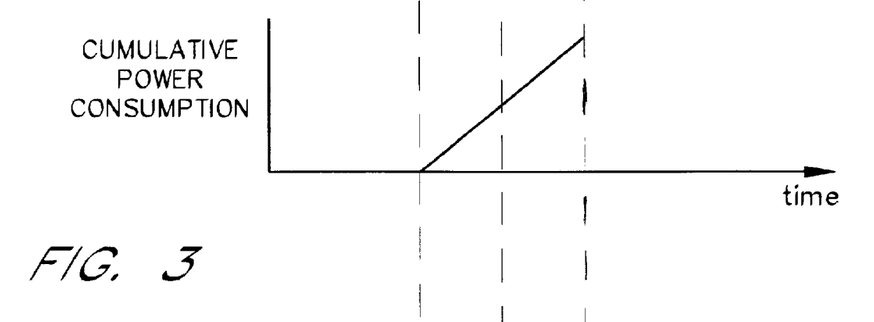
FIG. 3 is a graph illustrating a seek profile showing a plot of power consumption corresponding to the current profile of FIG. 2.
Figure 4:
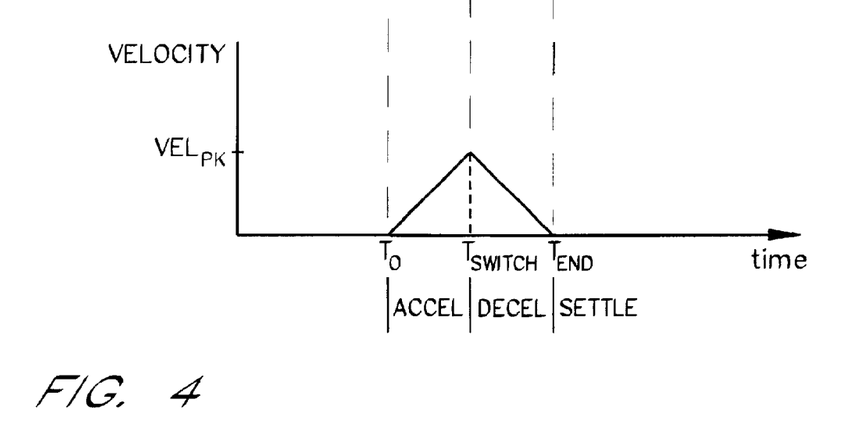
FIG. 4 is a graph illustrating a velocity profile corresponding to the current profile of FIG. 2.

In FIGS. 2–7, exemplary idealized current, cumulative power consumption and velocity seek profiles for two seek operations for a given distance are shown. In FIGS. 2–4, current, cumulative power and velocity profiles graphically illustrate a first seek operation. In FIG. 4, the actuator is commanded to accelerate at time $T_0$. This acceleration is maintained until the velocity of the actuator reaches a peak value $VEL_{PK}$. This occurs at time $T_{SWITCH}$. The actuator is then commanded to decelerate, until time $T_{END}$, at which time the deceleration and velocity are brought back to zero, and the head is positioned at the target track. In FIG. 2, the corresponding current expended to achieve the velocity profile shown in FIG. 4 is displayed. FIG. 3 shows the power consumed in expending the current as shown in FIG. 2.

Figure 5:
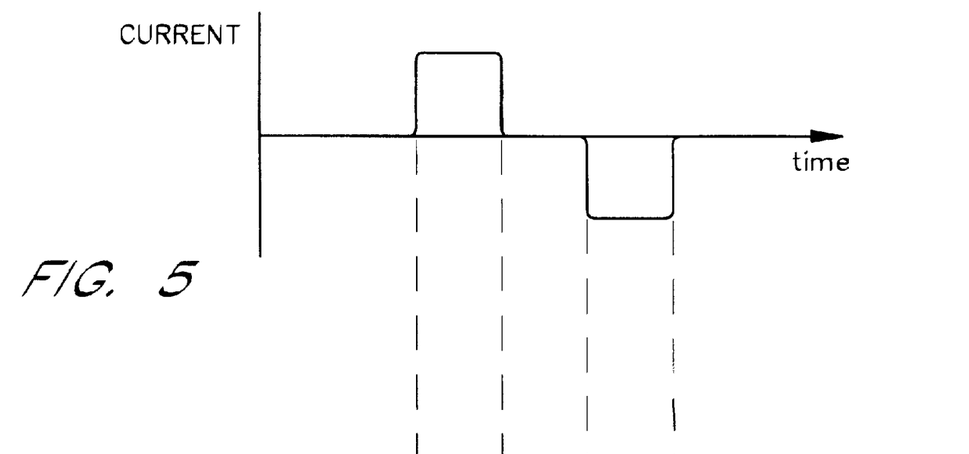
FIG. 5 is a graph illustrating a seek profile showing a plot of current applied to the voice coil motor incorporating a coast period.
Figure 6:
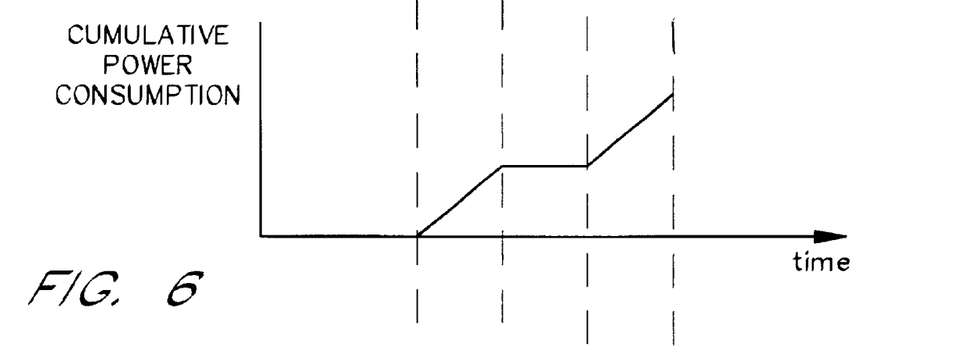
FIG. 6 is a graph illustrating a seek profile showing a plot of power consumption corresponding to the current profile of FIG. 5.
Figure 7:
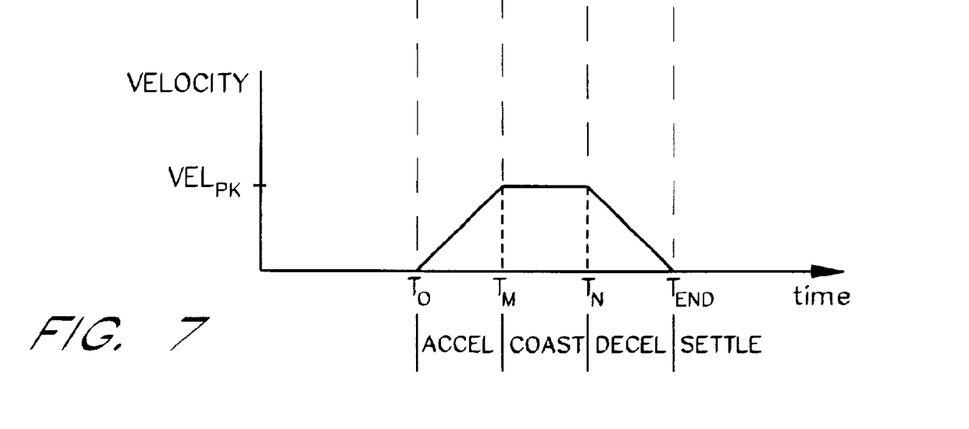
FIG. 7 is a graph illustrating a velocity profile corresponding to the current profile of FIG. 5.

In FIGS. 5–7, current, cumulative power consumption and velocity profiles graphically illustrate another seek operation in which a coast period is used. As illustrated, the actuator is commanded to accelerate at time $T_0$. This acceleration is held until the actuator reaches maximum velocity $VEL_{PK}$ at time $T_M$, where $T_M$ is the length of time required to reach maximum velocity. In this example, the maximum velocity $VEL_{PK}$ is held (in a "coast" mode) until time $T_N$, at which time the actuator is commanded to decelerate so that the velocity decreases to zero at time $T_{END}$.

The velocity profiles illustrated in FIGS. 4 and 7 are idealized profiles in which the head velocity reaches zero at time $T_{END}$. It is understood in the art that many variables, including resonant modes of the actuator mechanics and stored energy in the actuator mechanics, prevent a precise correction of actuator velocity which would result in the head landing exactly on track at the conclusion of the seek. These variables may cause the head to overshoot the target track, requiring an extended settling period to position the head within an acceptable range of the target track center.

Disk drives have been designed to operate in a mobile environment. For example, a lap-top computer can be taken from the office or home to a remote location. Because the remote location may or may not have an external power source (e.g., line current), the mobile device is provided with an internal source of power such as, for example, a battery. As used herein, a "battery" refers to any of a number of sources of D.C. electrical energy which convert chemical energy, nuclear energy, solar energy, thermal energy, or the like, into electrical energy. Unlike external power sources, batteries have a limited amount of available energy, which needs to be conserved in order to extend the operating time of a mobile device between recharging or replacement of batteries. One typical example of an internal power source is a conventional rechargeable battery, such as a lithium-ion battery.

As shown in FIGS. 2 and 5, the servo system draws a significant amount of the available current in seeking target tracks. This results in power consumption that accumulates and can eventually drain the battery. As shown in FIGS. 3 and 6, power is consumed for both acceleration and deceleration operations.

SUMMARY OF THE INVENTION

A first aspect of the present invention is a method of performing a seek operation in a disk drive connectable to a mobile device that operates in a mobile environment using battery power and that operates in a docked environment using an external source of power. The disk drive has a spindle motor that rotates a storage medium at an operating angular velocity. The disk drive operates with a servo system that includes a head actuator drive circuit that applies a current to a head actuator to cause the head actuator to move a head to a track of the storage medium and to maintain a position of the head over a selected track of the storage medium. The mobile device provides a command to the disk drive to cause the servo system to perform the seek operation to the selected track. The method comprises the step of receiving an environment signal from the mobile device that indicates whether the mobile device is operating in the docked environment or the mobile environment. The method rotates the storage medium at a same nominal operating angular velocity in the mobile environment and in the docked environment. The method responds to the environment signal and to the command from the host processor to perform one of two alternative steps. The method applies a first set of digital values to the head actuator drive circuit to apply a first current profile to the head actuator to cause the head actuator to move the head to the selected track with a first velocity profile when the environment signal indicates that the mobile device is in the docked environment. The method applies a second set of digital values to the head actuator drive circuit to apply a second current profile to cause the head actuator to move the head to the selected track with a second velocity profile when the environment signal indicates that the mobile device is in the mobile environment.

In accordance with one preferred embodiment of the method, when the method applies the first set of digital values to the head actuator drive circuit to apply the first current profile, the method selects a first acceleration current magnitude and a first acceleration current duration, and when the method applies the second set of digital values to the head actuator drive circuit to apply the second current profile, the method selects a second acceleration current magnitude and a second acceleration current duration. In one particularly preferred embodiment of the method, the second acceleration current magnitude is less than the first acceleration current magnitude. Alternatively, the second acceleration current duration is less than the first acceleration current duration. As a further alternative, the second acceleration current duration is less than the first acceleration current duration, and the second acceleration current magnitude is less than the first acceleration current magnitude.

A second aspect of the present invention is a mobile device that comprises a disk drive and a servo system. The disk drive has a spindle motor that rotates a storage medium at an operating angular velocity, wherein the mobile device operates in a mobile environment using battery power and operates in a docked environment using an external source of power. The servo system has a head actuator drive circuit that applies a current to a head actuator to cause the head actuator to move a head to a selected track of the storage medium. The mobile device comprises an input terminal that receives an environment signal that indicates whether the mobile device is operating in the docked environment or in the mobile environment. A spindle motor controller rotates the storage media at a same nominal operating angular velocity in the mobile environment and in the docked environment. A servo controller is responsive to the environment signal and to a command from the mobile device. The servo controller applies a first set of digital values to the head actuator drive circuit to generate a first current profile to apply to the head actuator to cause the head actuator to move the head to the selected track with a first velocity profile when the environment signal indicates that the mobile device is in the docked environment. The servo controller applies a second set of digital values to the head actuator drive circuit to generate a second current profile to apply to the head actuator to cause the head actuator to move the head to the selected track with a second velocity profile when the environment signal indicates that the mobile device is in the mobile environment.

In accordance with one preferred embodiment of this aspect, the servo controller causes the head actuator drive circuit to generate the first current profile by outputting a first acceleration current magnitude and a first acceleration current duration, and to generate the second current profile by outputting a second acceleration current magnitude and a second acceleration current duration. In one particularly preferred embodiment of this aspect, the second acceleration current magnitude is less than the first acceleration current magnitude. Alternatively, the second acceleration current duration is less than the first acceleration current duration. As a further alternative, the second acceleration current duration is less than the first acceleration current duration, and the second acceleration current magnitude is less than the first acceleration current magnitude.

Another aspect of the present invention is a mobile device that comprises a disk drive and a servo system. The mobile device operates in a mobile environment using battery power and operates in a docked environment using an external source of power. The disk drive includes a spindle motor for rotating a storage medium at an operating angular velocity. The servo system controls the movement of a head actuator in the disk drive. The servo system has a head actuator drive circuit that applies a current to a head actuator to cause the head actuator to move a head to a selected track of the storage medium. The mobile device comprises means for receiving an environment signal that indicates whether the mobile device is operating in the docked environment or the mobile environment. The mobile device further includes means for rotating the storage media at a same nominal operating angular velocity in the mobile environment and in the docked environment. The mobile device further includes means for responding to the environment signal and to the command from the mobile device to perform one of two functions. When the environment signal indicates that the mobile device is in the docked environment, the means for responding applies a first set of digital values to the head actuator drive circuit to apply a first current profile to the head actuator to cause the head actuator to move the head to the selected track with a first velocity profile. When the environment signal indicates that the mobile device is in the mobile environment, the means for responding applies a second set of digital values to the head actuator drive circuit to apply a second current profile to cause the head actuator to move the head to the selected track with a second velocity profile.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION OF THE PREFERRED EMBODIMENT

The present invention provides a method and apparatus for reducing battery drain in a mobile device including a disk drive by generating a low battery drain seek profile for mobile environments. Specifically, the current portion of each profile may differ (in amplitude and duration) between docked and mobile environments, the coast portion of each profile may differ (in amplitude and duration) between docked and mobile environments (or may be omitted).

Figure 1A:
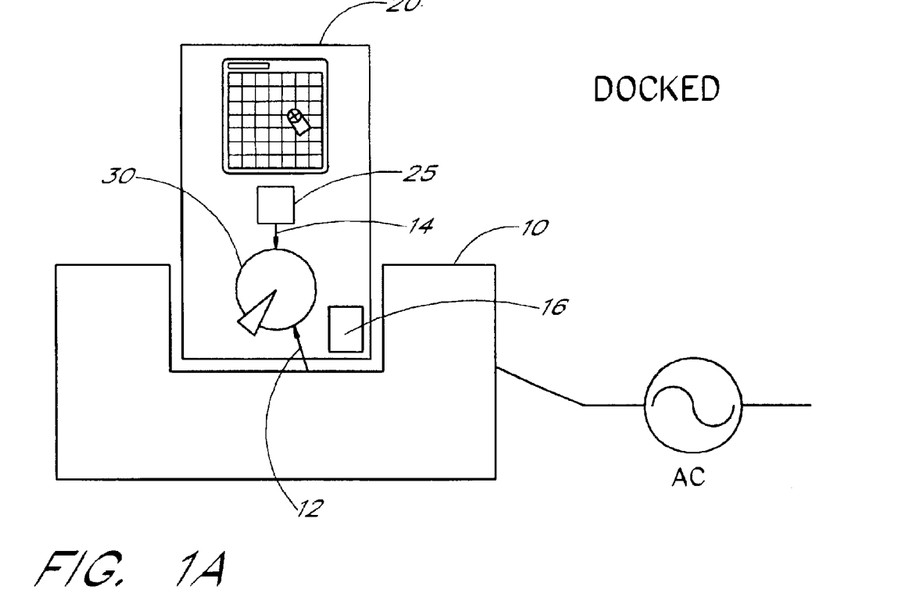
FIG. 1A is a block diagram illustrating a mobile device that includes a disk drive and further illustrating a docking station in which the mobile device is seated so that the mobile device can operate on external power.

As shown in FIG. 1A, a mobile device 20 includes a disk drive 30, a battery 16, and a host processor 25. The mobile device 20 is adapted to being placed into a docking station 10 wherein the mobile device 20 receives an external source of power and wherein the mobile device 20 can electrically communicate with other devices (e.g., for transferring information). When resting in the docking station 10, the mobile device 20 is said to be in a "docked environment" and to be operating in a "docked environment mode." When not in the docking station 10, the mobile device 20 receives power from the battery 16 and is said to be in a "mobile environment" and to be operating in a "mobile environment mode." The mobile device 20 receives an environment signal from the docking station 10 when the mobile device 20 is docked in the docking station 10. The environment signal may be provided as an input to the mobile device 20 and thus to the disk drive 30, as illustrated by a first environment signal 12 in FIG. 1A. Alternatively, the mobile device 20 generates an environment signal in response to being in the docking station 10 and provides the generated environment signal to the disk drive 30, as illustrated by a second environment signal 14 in FIG. 1A. The environment signal 12 or 14 will be discussed in more detail below. As discussed in greater detail below, the disk drive 30 in the mobile device 20 alters its seek operation based on an environment signal (discussed below), which indicates whether the mobile device 20 and the disk drive 30 are in the mobile environment or the docked environment. In particular, the disk drive 30 changes between the docked environment mode and the mobile environment mode in response to the environment signal.

Figure 1B:
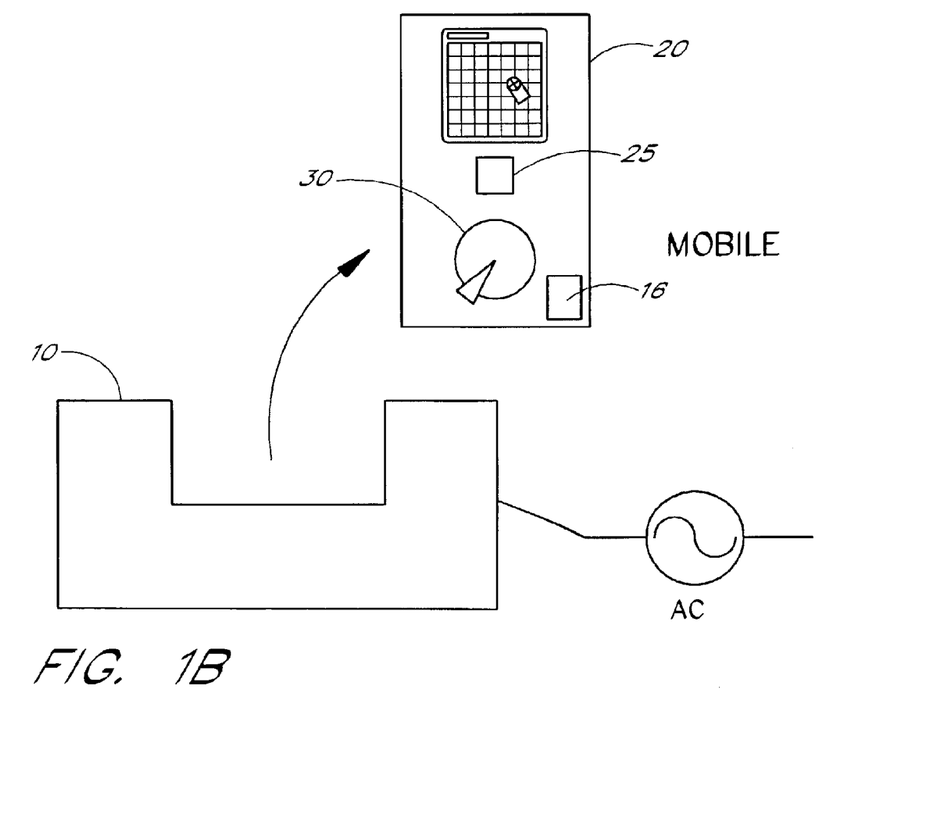
FIG. 1B is a block diagram illustrating the mobile device and docking station of FIG. 1A with the mobile device removed from the docking station.
Figure 1C:
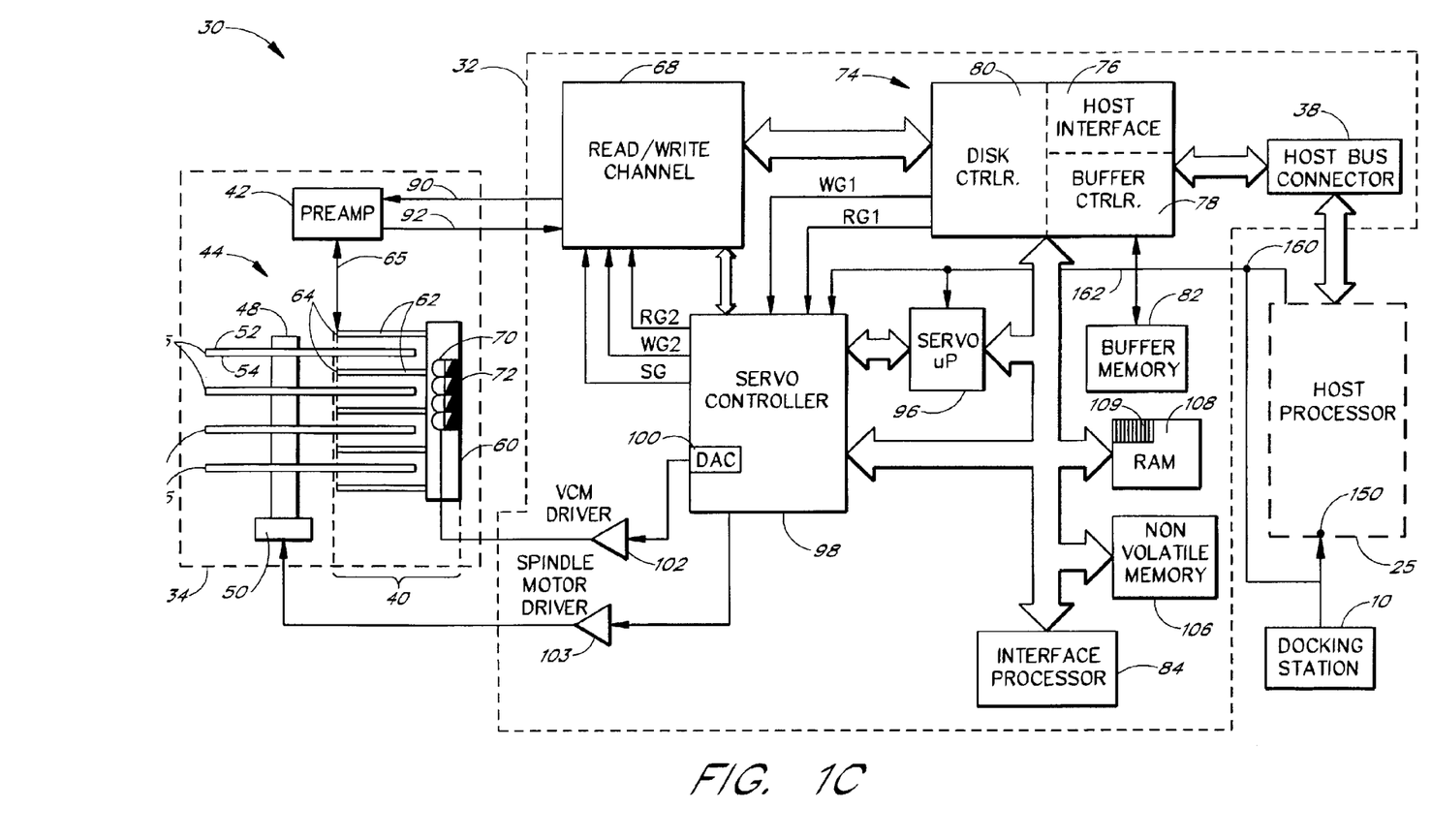
FIG. 1C is a block diagram illustrating one embodiment of a hard disk drive system having different seek profile selection based on environment for reduced power consumption in accordance with the present invention.

As illustrated in FIG. 1B, the mobile device 20 includes a host processor 25 and the hard disk drive 30. The disk drive 30 employs a method for reducing battery drain by selecting a seek profile based on whether the mobile device 20 and the disk drive 30 are in the docked environment or in the mobile environment (i.e., whether the disk drive 30 is operating in the mobile environment mode or is operating in the docked environment mode).

The disk drive 30 includes a disk control system 32 and a head disk assembly (HDA) 34. The disk control system 32 includes circuitry and processors which provide an intelligent disk control system interface between a host processor 25 and the HDA 34 for execution of read and write commands. The host processor 25 can include a microprocessor based data processing system which can alternately be docked or mobile such as a personal computer, personal digital assistant, cellular phone or other system capable of performing a sequence of logical operations. When docked, the data processing system draws electrical power from an external source that is effectively infinite, i.e. is not cyclically charged and depleted. When mobile, the data processing system draws electrical power from an internal source, such as a battery or any other source of electrical energy having finite storage capacity. Data is transmitted between the host processor 25 and the disk control system 32 via a host bus connector 38.

The HDA 34 includes a head actuator 40, a preamplifier 42, and a disk assembly 44. The disk assembly 44 includes one or more storage media disks, including magnetic media disks, such as indicated at 46. The disks 46 are stacked on a spindle assembly 48. The spindle assembly 48 is mechanically coupled to a spindle motor 50 that rotates the disks 46 at a high rate of speed. Each disk 46 includes up to two disk recording surfaces (i.e., disk surfaces) capable of storing data thereon, such as indicated at 52 and 54.

The head actuator 40 includes a voice coil motor (VCM) 60 and multiple actuator arms 62 extending from the VCM 60. Transducer heads 64 are disposed at the ends of the actuator arms 62 for communicating with a respective disk surface such as 52, 54. The transducer heads 64 communicate with the disk control system 32 via the preamplifier 42 for reading and writing data to the associated disk surface 52, 54. The preamplifier 42 is electrically coupled to the transducer heads 64 by connecting means, indicated at 65, for receiving and recording signals which are representative of magnetic transitions on a selected disk surface 52, 54. The preamplifier 42 provides an amplified signal to a read/write channel 68 of the disk control system 32. The read/write channel 68 performs encoding and decoding of data written to and read from the disks 46. The read/write channel 68 is described in detail further in the U.S. Pat. No. 6,195,222, which is incorporated by reference herein.

The VCM 60 includes a coil 70 moving in proximity to a permanent magnet 72. The actuator arms 62 are permanently coupled to the VCM 60. The VCM 60 controllably swings the actuator arms 62 and their corresponding transducer heads 64 back and forth over their associated disk surface 52, 54 to access target data tracks formed on the associated disk surface.

The disk control system 32 includes an integrated circuit host interface and disk controller (HIDC) 74 having a host interface 76, a buffer controller 78 and a disk controller 80. The host interface 76 communicates with the host processor 25 via the host bus connector 38 by receiving commands and data from and transmitting status and data back to the host processor 25. The buffer controller 78 controls a buffer memory 82 employed for storing data from the host processor 25 which is to be written to a disk surface (e.g., the disk surface 52). In addition, the buffer controller 78 controls the buffer memory 82 for storing data read from the disk surface 52. The host interface 76 provides for the data to be transmitted to and from the host system. The buffer memory 82 typically comprises random access memory (RAM), such as dynamic random access memory (DRAM). The disk controller 80 sends data to and receives data from the read/write channel 68. The disk controller 80 also provides for error correction and error detection on data read from a disk surface.

An interface processor 84 handles the flow of data commands received by the host interface 76 by sending commands to and reading status from the disk controller 80. The interface processor 84 ascertains which commands to process from the host processor 25 and when to process these commands, and directs other tasks performed by the disk controller 80. The processing functions of the interface processor 84 and the host processor 25 may be partitioned differently. For example, in an alternative embodiment (not shown), the functions of the interface processor 84 and the host processor 25 may be combined into one processor.

The read/write channel 68 is coupled to the preamplifier 42, indicated by read lines 92 and write lines 90. During a read operation, the preamplifier 42 amplifies the transition pulses that are detected by a transducer head 64 associated with a disk surface and amplifies them to a signal level that can be processed by the read/write channel 68. The read/write channel 68 receives the magnetic transmission pulses read from the disk surface and further amplifies, filters and converts the transition pulses into digital data which is output to the disk controller 80. During a write operation, the read/write channel 68 receives data from the disk controller 80 and converts the data into pulses for writing data to a disk surface via write the lines 90 and the preamplifier 42. The preamplifier 42 generates current to drive the transducer head to write transitions on the disk surface.

A servo processor 96 commands a servo controller 98 to control the position of the transducer head 64 over the disk 46 at a target data track for subsequent execution of read or write commands. The servo processor 96 and receives a representative form of a position signal sensed by transducer head 64 via the preamplifier 42 and the read/write channel 68 and performs calculations to position the transducer head 64 relative to its associated disk surface via commands to the servo controller 98. As discussed in more detail below, the servo controller 98 is responsive to the environment signal to operate in either the docked environment mode or the mobile environment mode to provide different seek profiles for the two modes. Thus, the servo controller 98 is a means for responding to the environment signal and to commands from the mobile device 20 to control the movement of the transducer head 64.

A head actuator drive circuit comprises a digital-to-analog converter (DAC) 100, and a VCM driver 102. The DAC 100 in the servo controller 98 responds to digital commands from the servo processor 96 to provide a corresponding analog signal to the VCM driver 102. The VCM driver 102 responds to the analog signal from the DAC 100 to provide a corresponding current to the VCM 60. The current from the VCM driver 102 is provided to the coil 70 of the VCM 60 and causes movement of the head actuator 40 which in turn causes the attached actuator arms 62 to swing and thereby move the transducer head 64 over an associated disk surface 52, 54 to access target data tracks. The servo processor 96 also provides commands to the servo controller 98 to control the operating angular velocity of the spindle motor 50. The servo processor 96 controls the operating angular velocity of the spindle motor 50 via the servo controller 98 and a spindle motor driver 103 to maintain a substantially constant operating angular velocity of the rotating disks 46. Thus, the spindle motor 50, the servo controller 98 and the spindle motor driver 103 operate as a means for rotating the storage media. In this context, "operating angular velocity" means an angular velocity during which time data transfer to and from the disk media occurs. By maintaining the nominal value of the operating angular velocity to be the same in a docked or mobile environment, the servo system is operated at the same optimum servo sampling rate with an efficient surface format as described above.

The disk control system 32 further includes a read gate RG1 and a write gate WG1 electrically coupled between the disk controller 80 and the servo controller 98. A read gate RG2 and a write gate WG2 are electrically coupled between the servo controller 98 and the read/write channel 68. The read gates RG1 and RG2 must be asserted for reading of data from a disk surface through the read/write channel 68. Similarly, the write gates WG1 and WG2 must be asserted before writing of data occurs on a disk surface through the read/write channel 68. A servo gate signal SG is enabled when reading servo data from a servo wedge located on a disk surface. Also, the read gate RG1 or the write gate WG1 may be asserted, but the servo controller 98 may prohibit the reading or writing of data. For example, when writing data to a disk surface, the interface processor 84 may command the disk controller 80 to write multiple blocks of data to a data region or series of data sectors on a disk surface, but the servo controller 98 may prohibit writing by not enabling the write gate WG2 if the transducer head is not on track with the desired target track.

Disk drive control system (including servo system) operational programs are stored in a non-volatile memory 106, which may be read-only memory (ROM) or flash memory, and may be loaded into a RAM 108 for execution. Alternatively, system operational programs may be stored on reserve cylinders on the disk 46. Upon startup of the hard disk drive 30, disk drive programs, such as the servo system operational programs, are transferred into the RAM 108 for fast access by the servo processor 96 for positioning the transducer head 64 for execution of non-queued and queued commands. The RAM 108 also may include seek profile tables 109 for storing separate seek profiles for positioning the actuator head to execute commands in the mobile and in the docked environment.

The use of separate seek profiles stored in the tables 109 to reduce battery drain by reducing consumption of stored electrical energy is discussed in detail later in the specification.

In an exemplary operation of the disk drive 30, the servo processor 96 receives a command to position the head actuator 40 for accessing data or writing data on a specific target data track on a disk surface 52 or 54. In operation of the disk drive 30, the disk controller 80 keeps track of where the transducer head 64 is passing over data sectors and servo wedges, and the servo processor 96 keeps track of which circular data track or "cylinder" of data tracks the transducer head is over, and keeps the transducer head tracking or following on the desired target data track.

The current circular data track position of the transducer head 64 is stored in the RAM 108 to permit the servo processor 96 to determine a required seek distance between the current data track and a target data track on the disk 46. Based on a docked or mobile environment, the servo processor 96 retrieves a corresponding docked or mobile seek profile from the RAM 108 and provides a digital signal command to the DAC 100 corresponding to the seek profile. The DAC 100 provides a corresponding analog signal to the VCM driver 102 representative of the seek profile. The VCM driver 102 provides a current output to the coil 70 of the VCM 60 for acceleration and/or deceleration of the actuator arm 62 to perform a seek operation to move the transducer head 64 from the current data track to the target data track. As the actuator arm 62 moves from the current data track to the target data track, position information is received through the sensing of the servo wedges disposed on the disk surface 52 or 54. Based on this position information, a position signal is provided via the preamplifier 42, the read/write channel 68, and the servo controller 98 to the servo processor 96 to provide a representative position of the transducer head 64 relative to its associated disk surface 52 or 54. Upon completion of a seek operation and the corresponding alignment of the transducer head 64 over the target data track, a read or write command is executed to read data from or write to the target data track.

The disk drive 30 receives commands from the host processor 25 via the host interface 76 and the interface processor 84. For example, the disk drive 30 queues the commands in the buffer memory 82, and the interface processor 84 employs a command re-ordering algorithm which sorts the queued input/output commands into an order which will optimize disk drive performance and reduce disk drive latency. For example, a reordering algorithm may be used to reduce disk drive latency by putting commands in an order which results in consecutive commands seeking to the closest cylinder or resulting in the shortest seek time period accounting for rotational latency. Alternatively, in an exemplary non-queued environment, the disk drive 30 executes a series of host commands in the order received without re-ordering a queued stack of commands.

When the disk drive 30 is incorporated into a mobile device that can alternately be mobile or docked, consumption of the internal power source's finite energy becomes an important consideration. One of the main energy consumers within the host is the servo system. Therefore, one embodiment of the present invention involves reducing the energy consumption of the servo system in the mobile environment to conserve the battery power.

To this end, the mobile device 20 described in connection with FIG. 1B includes a means for receiving the environment signal. The means for receiving the environment signal advantageously includes an input terminal 150 on the mobile device 20 that receives the environment signal from the docking station 10. The environment signal could be a voltage level, a switch state, a logic signal, or another signal having at least two states generated by the docking station 10. For example, the presence of a voltage at a power input terminal of the mobile device 20 may also serve as the environment signal. Alternatively, the input terminal 150 may be automatically connected to a selected voltage reference (e.g., ground) when seated in the docking station 10.

In one embodiment, the environment signal on the terminal 150 may pass through the mobile device 20 and may be provided to the disk drive 30 as an input signal (e.g., a power signal or a logic signal) via a terminal 160 on the disk drive 30. This signal is advantageously provided as an input signal to the servo controller 98 or the servo microprocessor 96 to indicate whether the mobile device 20 is in the docked environment or in the mobile environment. Alternatively, when the environment signal is provided only to the mobile device 20, the host processor 25 in the mobile device 20 may regenerate the environment signal by toggling a signal provided to the terminal 160 of the disk drive 30. The regenerated environment signal is received by the servo controller 98 or the servo microprocessor 96, as discussed above. In a further alternative, the host processor 25 may be responsive to the state of the environment signal on the terminal 150 to generate a command sequence to the servo controller 98 via the host bus connector 36 to cause the servo controller 98 to switch between the docked environment mode and the mobile environment mode.

As discussed above, the disk drive 30 also includes the VCM driver 102 that is responsive to the servo controller 98, which is responsive to the environment signal and to a command from the mobile device. The VCM driver 102 responds to the environment signal and to the command from the mobile device to apply either a first set of digital values or a second set of digital values to the digital-to-analog converter 100 to generate either a first or a second current profile to apply to the head actuator 40. The first set of digital values is applied when the environment signal indicates that the mobile device is in the docked environment. The second set of digital values is applied when the environment signal indicates that the mobile device is in the mobile environment.

Other variations within the scope of the invention are also possible. For example, the second current profile could be invoked only when the number of tracks to be traversed from a current track to a desired track is at least as large as a predetermined number. For example, the second current profile could be invoked only when the environment signal indicates that the device 20 is in a mobile environment and when the number of tracks to be traversed is at least as large as 200.

Some examples of the many current profiles that are contemplated by this invention are shown in FIGS. 8–16. In FIGS. 8–16, dashed lines that are colinear with solid lines are shown slightly offset from the solid lines for clarity.

Figure 8:
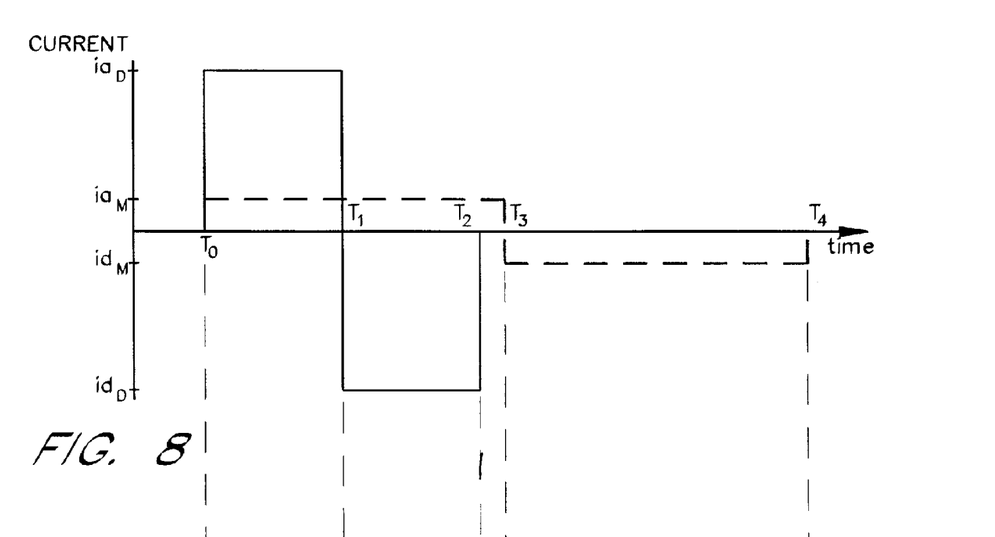
FIG. 8 is a graph illustrating the current profiles of one embodiment of the docked and mobile seek profiles for a given seek distance for a hard disk drive in accordance with the present invention.
Figure 9:
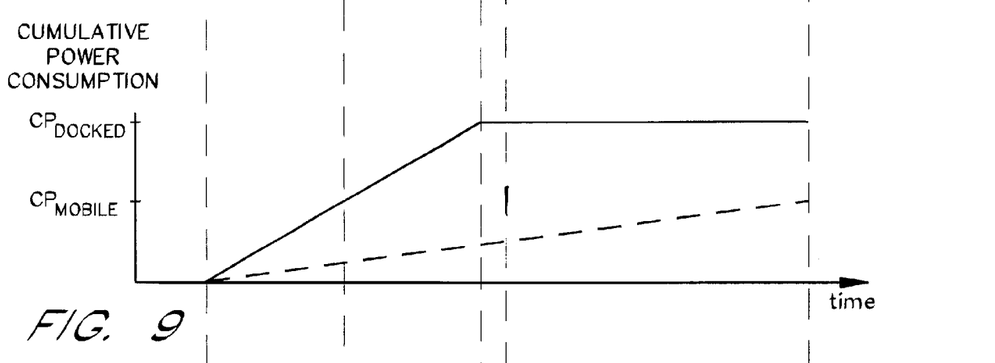
FIG. 9 is a graph illustrating cumulative power consumption corresponding to the docked and mobile seek profiles of FIG. 8.
Figure 10:
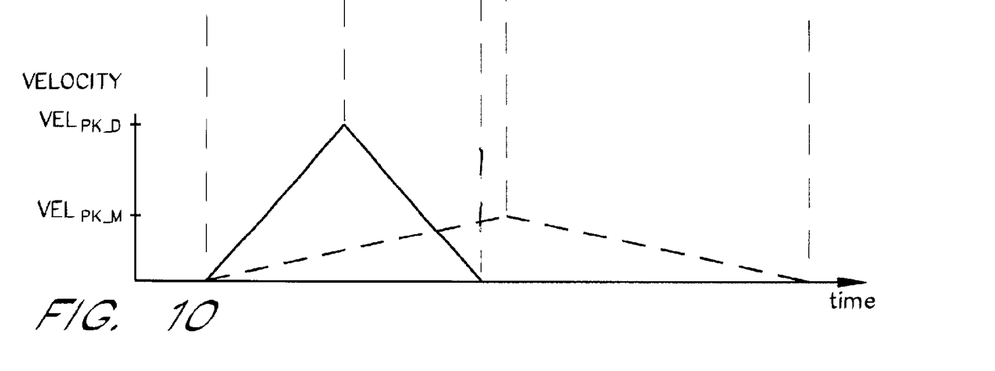
FIG. 10 is a graph illustrating velocity profiles corresponding to the docked and mobile seek profiles of FIG. 8.

As shown in FIGS. 8–10, one embodiment reduces the magnitude of a second acceleration current $ia_M$ compared to the magnitude of a first acceleration current $ia_D$. In this embodiment, the first acceleration current $ia_D$ is applied from a time $T_0$ until a time $T_1$. Then a first deceleration current $id_1$ is applied from the time $T_1$ to a time $T_2$. In the second current profile, on the other hand, the second acceleration current $ia_M$ is applied from a time $T_0$ until a time $T_3$. Then, the second deceleration current $ia_M$ is applied from the time $T_3$ to the time $T_4$.

Because the magnitude of the acceleration and deceleration currents are lower for the second profile compared to the first profile, the slope of the velocity curve shown in FIG. 10 is less for the second velocity profile. This results in a lower maximum velocity $VEL_{PK\_M}$ for the second current profile than a maximum velocity $VEL_{PK\_D}$ for the first current profile.

The cumulative power consumption for the two current profiles is shown in FIG. 9. As shown in first current profile, the slope of the power consumption curve is steeper for the first current profile than the slope of the second current profile power consumption curve. The first cumulative power consumption curve reaches its maximum point, $CP_{DOCKED}$, before the second cumulative power consumption curve reaches its maximum point, $CP_{MOBILE}$. However, as shown in FIG. 9, the magnitude of the $CP_{MOBILE}$ is less than $CP_{DOCKED}$.

Figure 11:
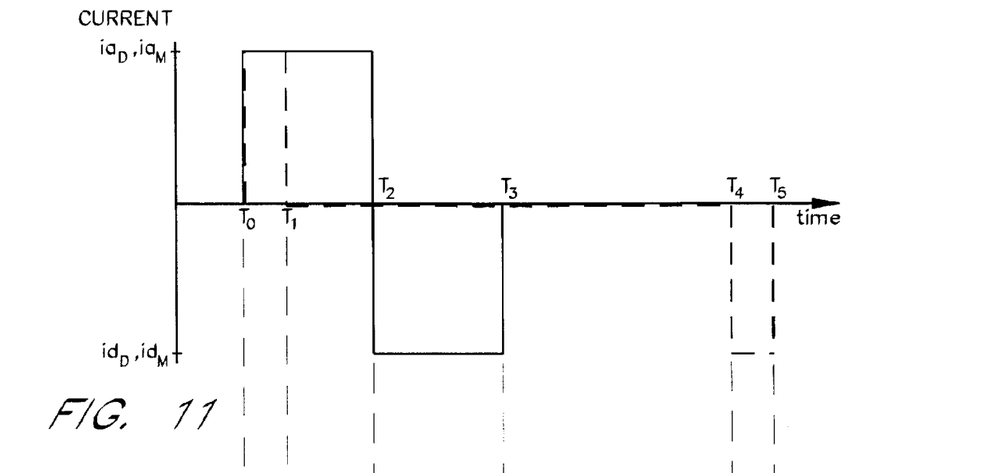
FIG. 11 is a graph illustrating the current profiles of another embodiment of the docked and mobile seek profiles for a given seek distance for a hard disk drive of the present invention.
Figure 12:
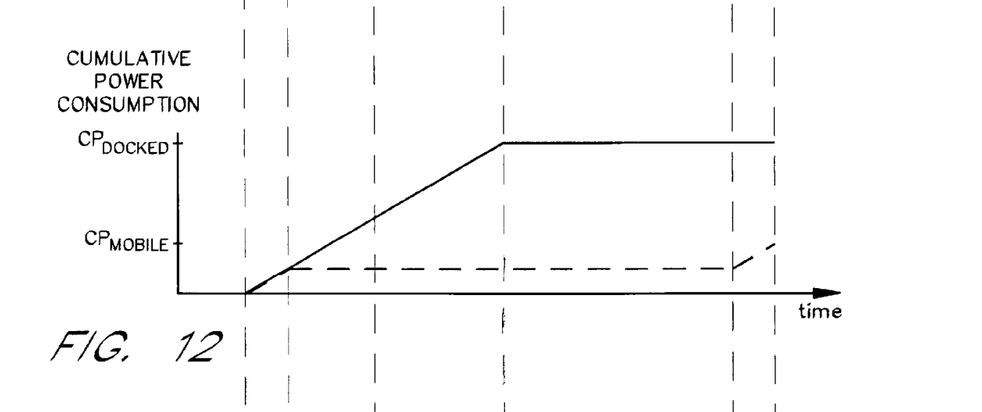
FIG. 12 is a graph illustrating cumulative power consumption corresponding to the docked and mobile seek profiles of FIG. 11.
Figure 13:
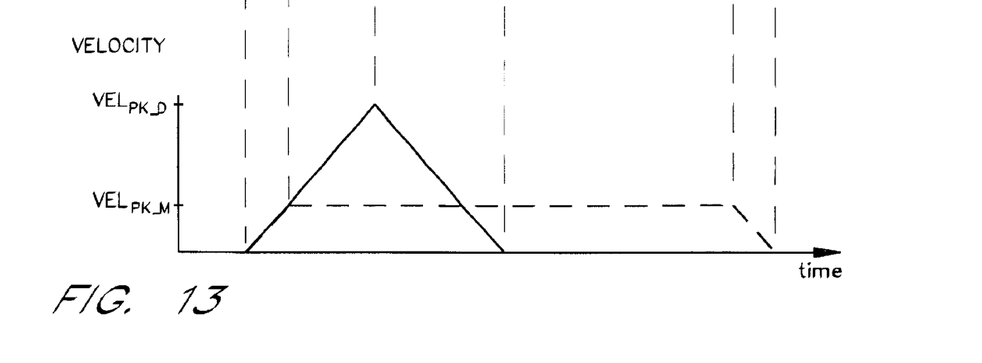
FIG. 13 is a graph illustrating velocity profiles corresponding to the docked and mobile seek profiles of FIG. 11.

Another embodiment, shown in FIGS. 11–13, reduces battery drain by reducing the acceleration duration for the second current profile.

As shown in FIG. 11, the first current profile begins at a time $T_0$, when a first acceleration current of magnitude $ia_D$ is applied to the head actuator. This current is applied until $T_2$ when a first deceleration current $id_D$ is applied to the head actuator. The first deceleration current $id_D$ is applied until time $T_3$, when the head actuator comes to rest on the desired track.

The second current profile also begins at a time $T_0$, where a second acceleration current of magnitude iaM is applied to the head actuator. This current is applied until a time $T_1$, when no current is applied to the head actuator. At a time $T_4$, a second deceleration current $id_M$ is applied to the head actuator. This current is applied until a time $T_5$, when the head actuator comes to rest on the desired track.

The power consumed by the current profiles illustrated in FIG. 11 is shown in FIG. 12. Power consumption beings at the time $T_0$ by the application of current to the head actuator according to the first current profile. This power consumption continues at a constant rate until the time $T_3$, when the deceleration current $id_1$ is no longer applied. Similarly, the power consumed by application of the current to the head actuator according to the second current profile also starts at the time $T_0$. Power consumption continues at the same rate as in the first current profile, but stops at the time $T_1$, when no current is applied in the second current profile. Power is once again consumed from the time $T_4$ to the time $T_5$, when the deceleration current $id_2$ is applied to the head actuator in the second current profile. As can be seen in FIG. 12, the total cumulative power consumed in performing the seek is less for the second current profile than for the first current profile.

As shown in FIG. 13, the velocity achieved is different for the first and the second current profiles. The first current profile causes the velocity of the head actuator to increase at a first rate until the time $T_2$, when the first acceleration current $ia_D$ is no longer applied. At the time $T_2$, the velocity of the head actuator reaches its maximum, $VEL_{PK\_D}$. The second current profile causes the velocity of the head actuator to increase until the time $T_1$, when the second acceleration current $ia_M$ is no longer applied. At the time $T_1$, the velocity of the head actuator is a maximum $VEL_{PK\_M}$. The head actuator velocity remains constant (i.e., it coasts) until time the time $T_4$, when the second deceleration current $id_2$ is applied. As a result, the velocity of the head actuator decreases under the second current profile until the head actuator comes to rest on the desired track at the time $T_5$.

Figure 14:
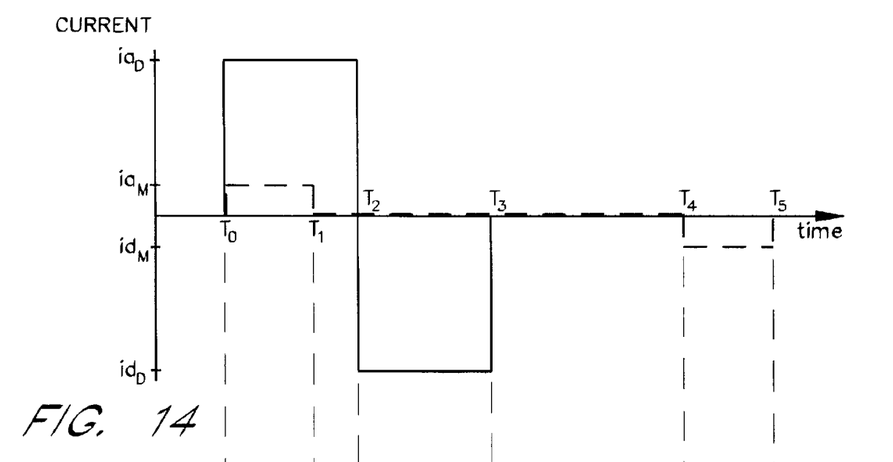
FIG. 14 is a graph illustrating the current profiles of yet another embodiment of the docked and mobile seek profiles for a given seek distance for a hard disk drive of the present invention.

The first and second current profiles of another embodiment are shown in FIG. 14. In this embodiment, under the first current profile, a current of magnitude $ia_D$ is applied from a time $T_0$ until a time $T_2$. At the time $T_2$, a deceleration current of magnitude $id_1$ is applied. At a time $T_3$, the deceleration current $id_1$ is no longer applied and the head actuator brings the head to rest on the desired track.

The second current profile according to this embodiment, illustrated in FIG. 14 as a dashed line, applies acceleration current of magnitude $ia_D$ from the time $T_0$ until a time $T_1$. At the time $T_1$, the acceleration current is switched off and no current is applied until a time $T_4$. The head actuator "coasts" from the time $T_1$ until the time $T_4$. At the time $T_4$, a deceleration current of magnitude $id_2$ is applied. This current is applied from the time $T_4$ until a time $T_5$, when the second current profile is again switched off. As also shown in FIG. 14, the magnitude of the first acceleration current $ia_D$ is greater than the magnitude of the second acceleration current $ia_M$. As also may be seen in FIG. 14, the first acceleration current duration is greater than the second acceleration duration.

Figure 16:
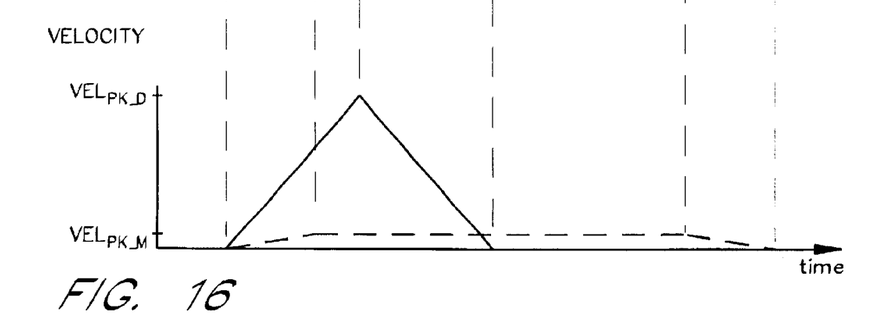
FIG. 16 is a graph illustrating velocity profiles corresponding to the docked and mobile seek profiles of FIG. 14.

The corresponding velocity profiles for the first and second current profiles of FIG. 14 are illustrated in FIG. 16. The maximum velocity $VEL_{PK\_D}$ for the first current profile is achieved at the time $T_2$, when the current $ia_D$ is switched off. The velocity of corresponding to the first current profile returns to zero at the time $T_3$, when the head actuator brings the head to the desired track. The maximum velocity $VEL_{PK\_M}$ for the second current profile is achieved at the time $T_1$, when the acceleration current $ia_M$ is switched off. This velocity is maintained during the coast from the time $T_1$ to the time $T_4$. At the time $T_5$, the velocity of the head actuator is brought back to zero as the head arrives at the desired track.

Figure 15:
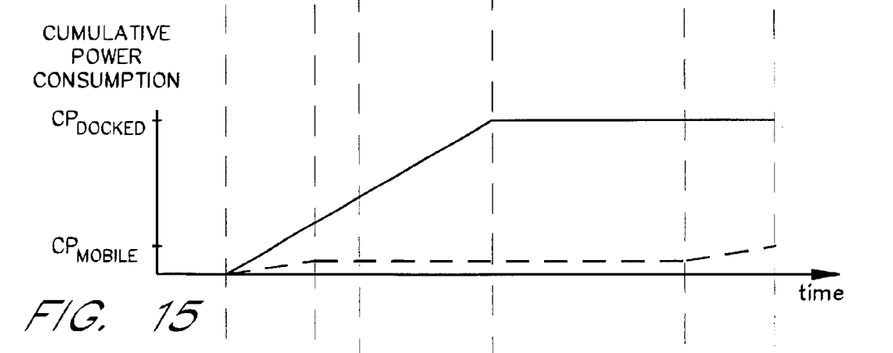
FIG. 15 is a graph illustrating cumulative power consumption corresponding to the docked and mobile seek profiles of FIG. 14.

The power consumed for the first and second current profiles is illustrated in FIG. 15. The first current profile consumes power at a first rate from the time $T_0$ until the time $T_3$. After the time $T_3$ no more power is consumed. The second current profile consumes power from the time $T_0$ until the time $T_1$ at a lesser rate than is consumed in the first current profile during the same time. No power is consumed from the time $T_1$ until the time $T_4$. Power is again consumed from the time $T_4$ until the time $T_5$. As illustrated in FIG. 15, the total power consumed by the second current profile $CP_{MOBILE}$ of this embodiment is much less than the power consumed by the first current profile $CP_{DOCKED}$ of this embodiment.

Figure 17:
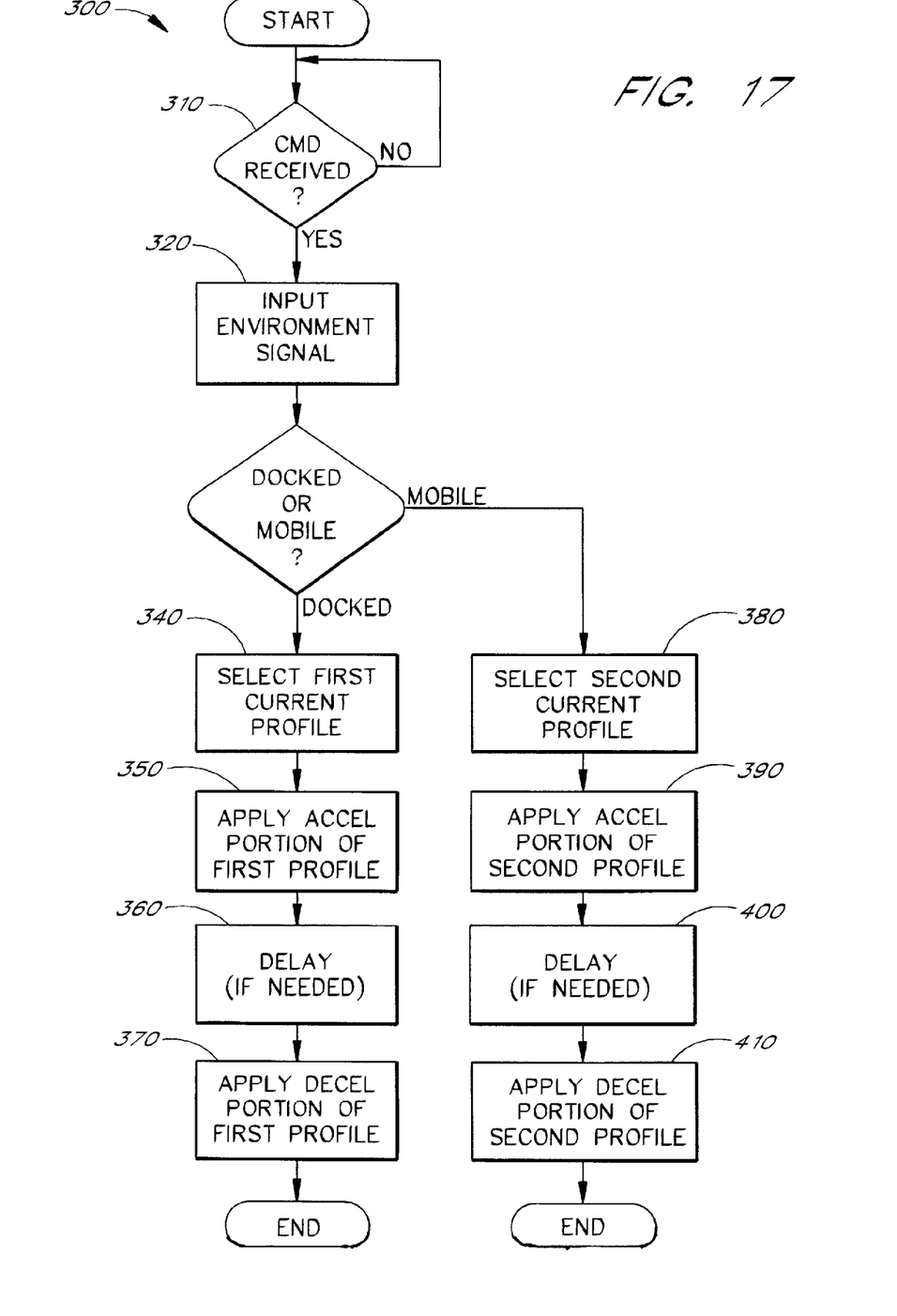
FIG. 17 is a process flow diagram illustrating one exemplary embodiment of a hard disk drive having a method of adapting seek performance to the operational environment in accordance with the present invention.

As illustrated by FIG. 17 (with reference to FIG. 1B), a process flow diagram illustrating one exemplary embodiment of a disk drive having a method of performing a seek operation in accordance with the present invention by using a different seek profile and for a mobile environment than for a docked environment is shown at 300. The disk drive 30 includes a servo processor 96 and HDA 34, wherein the servo processor 96 performs a seek operation from a current position to a target position using a current profile input to the head actuator 40. The profile includes an acceleration period, a deceleration period, and optionally, a coast period (see FIGS. 8–17).

The method includes a step 310 that checks whether a command has been received from the mobile device. If a command has been received, the method performs a step 320 to check whether an environment signal has been input by the host processor.

If an environment signal has been received, thus indicating that the mobile device is docked, a first current profile is selected in a step 340. Then, the acceleration portion of the first current profile is applied in a step 350. In some cases, this step 350 may be followed by a delay step 360. Next, the deceleration portion of the first current profile is applied in a step 370.

If an environment signal has been received indicating that the mobile device is mobile (i.e., not docked), a second current profile is selected in step 380. Then, the acceleration portion of the first current profile is applied in a step 390. In some cases, the step 390 may be followed by a delay step 400. Next, the deceleration portion of the first current profile is applied in a step 410.

What is claimed is:

1. A method of performing a seek operation in a disk drive connectable to a mobile device that operates in a mobile environment using battery power and that operates in a docked environment using an external source of power, the disk drive having a spindle motor that rotates a storage media at an operating angular velocity, the disk drive operating with a servo system that includes a head actuator drive circuit that applies a current to a head actuator to cause the head actuator to move a head to a track of the storage media and to maintain a position of the head over a selected track of the storage media, the mobile device providing a command to the disk drive to cause the servo system to perform the seek operation to the selected track, the method comprising the steps of:

receiving an environment signal from the mobile device that indicates whether the mobile device is operating in the docked environment or the mobile environment;

rotating the storage media at a same nominal operating angular velocity in the mobile environment and in the docked environment; and responding to the environment signal and to the command from the host processor to perform one of:

applying a first set of digital values to the head actuator drive circuit to apply a first current profile to the head actuator to cause the head actuator to move the head to the selected track with a first velocity profile when the environment signal indicates that the mobile device is in the docked environment; and applying a second set of digital values to the head actuator drive circuit to apply a second current profile to cause the head actuator to move the head to the selected track with a second velocity profile when the environment signal indicates that the mobile device is in the mobile environment.

2. The method of claim 1, further comprising the step of determining the number of tracks to be traversed from a current track to a desired track.

3. The method of claim 2, wherein the step of implementing the second current profile occurs only if the number of tracks to be traversed is greater than 200.

4. The method of claim 1, wherein the first current profile causes the first velocity profile to have a first maximum velocity, wherein the second current profile causes the second velocity profile to have a second maximum velocity.

5. The method of claim 4, wherein the second maximum velocity is less than the first maximum velocity.

6. The method of claim 5, wherein the second maximum velocity is approximately one-fourth the first maximum velocity.

7. The method of claim 1, wherein a reference voltage applied to the head actuator drive circuit is the same for the docked environment and for the mobile environment.

8. The method of claim 1, wherein the step of applying the first set of digital values to the head actuator drive circuit to apply the first current profile includes the step of selecting a first acceleration current magnitude and a first acceleration current duration, and wherein the step of applying the second set of digital values to the head actuator drive circuit to apply the second current profile includes the step of selecting a second acceleration current magnitude and a second acceleration current duration, wherein the second acceleration current magnitude is less than the first acceleration current magnitude.

9. The method of claim 1, wherein the step of applying the first set of digital values to the head actuator drive circuit to apply the first current profile includes the step of selecting a first acceleration current magnitude and a first acceleration current duration, and wherein the step of applying the second set of digital values to the head actuator drive circuit to apply the second current profile includes the step of selecting a second acceleration current magnitude and a second acceleration current duration, wherein the second acceleration current duration is less than the first acceleration current duration.

10. The method of claim 9, wherein the second acceleration current magnitude is less than the first acceleration current magnitude.

11. A mobile device comprising a disk drive and a servo system, the disk drive having a spindle motor that rotates a storage media at an operating angular velocity, wherein the mobile device operates in a mobile environment using battery power and operates in a docked environment using an external source of power, the servo system having a head actuator drive circuit that applies a current to a head actuator to cause the head actuator to move a head to a selected track of the storage media, the mobile device comprising:

an input terminal that receives an environment signal that indicates whether the mobile device is operating in the docked environment or in the mobile environment;

a spindle motor controller that rotates the storage media at a same nominal operating angular velocity in the mobile environment and in the docked environment; and a servo controller responsive to the environment signal and to a command from the mobile device to:
  apply a first set of digital values to the head actuator drive circuit to apply a first current profile to the head actuator to cause the head actuator to move the head to the selected track with a first velocity profile when the environment signal indicates that the mobile device is in the docked environment; and
  apply a second set of digital values to the head actuator drive circuit to apply a second current profile to the head actuator to cause the head actuator to move the head to the selected track with a second velocity profile when the environment signal indicates that the mobile device is in the mobile environment.

12. The device of claim 11, wherein, when the mobile device is in the mobile environment, the servo controller selects the second current profile only when the number of tracks to be traversed from a current track to a desired track is at least as large as a predetermined number.

13. The device of claim 12, wherein the predetermined number is 200.

14. The device of claim 11, wherein the first current profile causes the first velocity profile to have a first maximum velocity, wherein the second current profile causes the second velocity profile to have a second maximum velocity.

15. The device of claim 14, wherein the second maximum velocity is less than the first maximum velocity.

16. The device of claim 15, wherein the second maximum velocity is approximately one-fourth the first maximum velocity.

17. The device of claim 11, wherein a reference voltage applied to the head actuator drive circuit is the same for the docked environment and for the mobile environment.

18. The device of claim 11, wherein the servo controller causes the head actuator drive circuit to apply the first current profile by outputting a first acceleration current magnitude for a first acceleration current duration, and wherein the servo controller causes the head actuator drive circuit to apply the second current profile by outputting a second acceleration current magnitude for a second acceleration current duration, wherein the second acceleration current magnitude is less than the first acceleration current magnitude.

19. The device of claim 11, wherein the servo controller causes the head actuator drive circuit to apply the first current profile by outputting a first acceleration current magnitude for a first acceleration current duration, and wherein the servo controller causes the head actuator drive circuit to apply the second current profile by outputting a second acceleration current magnitude for a second acceleration current duration, wherein the second acceleration current duration is less than the first acceleration current duration.

20. The device of claim 19, wherein the second acceleration current magnitude is less than the first acceleration current magnitude.

21. A mobile device comprising a disk drive and a servo system, wherein the mobile device operates in a mobile environment using battery power and operates in a docked environment using an external source of power, the disk drive including a spindle motor for rotating a storage media at an operating angular velocity, the servo system controlling the movement of a head actuator in the disk drive, the servo system having a head actuator drive circuit that applies a current to a head actuator to cause the head actuator to move a head to a selected track of the storage media, the mobile device comprising:
  means for receiving an environment signal that indicates whether the mobile device is operating in the docked environment or the mobile environment;
  means for rotating the storage media at a same nominal operating angular velocity in the mobile environment and in the docked environment; and
  means for responding to the environment signal and to the command from the mobile device to perform one of:
    applying a first set of digital values to the head actuator drive circuit to apply a first current profile to the head actuator to cause the head actuator to move the head to the selected track with a first velocity profile when the environment signal indicates that the mobile device is in the docked environment; and
    applying a second set of digital values to the head actuator drive circuit to apply a second current profile to cause the head actuator to move the head to the selected track with a second velocity profile when the environment signal indicates that the mobile device is in the mobile environment.

* * * * *